United States Patent
Roth et al.

(10) Patent No.: US 9,471,533 B1
(45) Date of Patent: Oct. 18, 2016

(54) DEFENSES AGAINST USE OF TAINTED CACHE

(71) Applicant: Amazon Technologies, Inc., Reno, NV (US)

(72) Inventors: Gregory Branchek Roth, Seattle, WA (US); Nicholas Howard Brown, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 521 days.

(21) Appl. No.: 13/787,568

(22) Filed: Mar. 6, 2013

(51) Int. Cl.
*G06F 15/167* (2006.01)
*G06F 17/30* (2006.01)
*H04L 29/08* (2006.01)
*H04L 29/06* (2006.01)

(52) U.S. Cl.
CPC ....... *G06F 15/167* (2013.01); *G06F 17/30902* (2013.01); *H04L 63/10* (2013.01); *H04L 67/2852* (2013.01)

(58) Field of Classification Search
CPC ............... G06F 17/3089; G06F 17/30902; G06F 17/30132; G06F 12/0815; G06F 12/0862; G06F 19/3418; H04L 67/2852; H04L 12/18; H04L 12/6418; H04L 63/126; H04L 63/0807; H04L 63/1466; H04L 61/1511; H04L 67/42
USPC ........................................................ 709/213
See application file for complete search history.

(56) References Cited

U.S. PATENT DOCUMENTS

| | | | |
|---|---|---|---|
| 6,256,747 B1 | 7/2001 | Inhohara et al. | |
| 6,418,544 B1 | 7/2002 | Nesbitt et al. | |
| 6,553,409 B1 | 4/2003 | Zhang et al. | |
| 8,078,759 B2 | 12/2011 | Seifert et al. | |
| 8,584,234 B1 * | 11/2013 | Sobel | H04L 29/06 726/22 |
| 8,639,770 B1 * | 1/2014 | Raley et al. | 709/216 |
| 2003/0177353 A1 * | 9/2003 | Hiltgen | 713/161 |
| 2005/0138176 A1 | 6/2005 | Singh et al. | |
| 2005/0240940 A1 * | 10/2005 | Quinet et al. | 719/315 |
| 2006/0005016 A1 * | 1/2006 | Lee | G06F 8/63 713/164 |
| 2006/0101273 A1 * | 5/2006 | Tan | H04L 63/0414 713/182 |
| 2006/0233166 A1 * | 10/2006 | Bou-Diab | H04L 63/08 370/389 |
| 2007/0106748 A1 * | 5/2007 | Jakobsson et al. | 709/217 |
| 2008/0229025 A1 * | 9/2008 | Plamondon | 711/126 |
| 2009/0064299 A1 * | 3/2009 | Begorre et al. | 726/7 |
| 2010/0057995 A1 | 3/2010 | Cao et al. | |
| 2010/0145161 A1 | 6/2010 | Niyato et al. | |

(Continued)

OTHER PUBLICATIONS

Fielding et al.; "Hypertext Transfer Protocol—HTTP/1.1"; RFC 2616; The Internet Society; Jun. 1999; 529 pages.

(Continued)

*Primary Examiner* — Larry Donaghue
(74) *Attorney, Agent, or Firm* — Baker & Hostetler LLP

(57) ABSTRACT

Systems, methods, and computer readable media are described for validating objects stored in a web cache. In one embodiment, a computing device caches objects received while accessing networked content over a network. The computing device generates a description of conditions associated with the caching of the objects. When the computing device accesses networked content via a second network, the computing device or a remote server connected thereto utilizes the description to determine whether an object in the cache is trusted or untrusted. The server manages a policy that defines rules for making the determination. The policy can be generated based on descriptions received from a plurality of devices.

28 Claims, 12 Drawing Sheets

(56) References Cited

U.S. PATENT DOCUMENTS

| | | | |
|---|---|---|---|
| 2010/0325357 A1* | 12/2010 | Reddy | G06F 21/53 |
| | | | 711/118 |
| 2012/0023588 A1* | 1/2012 | Su | H04L 63/0236 |
| | | | 726/26 |
| 2012/0317235 A1 | 12/2012 | Nguyen et al. | |
| 2013/0054671 A1* | 2/2013 | Maki | 709/202 |
| 2014/0006538 A1 | 1/2014 | Oikonomou | |
| 2014/0189074 A1* | 7/2014 | Parker | H04L 63/20 |
| | | | 709/220 |
| 2015/0046507 A1* | 2/2015 | Saxena | H04L 63/20 |
| | | | 709/201 |

OTHER PUBLICATIONS

U.S. Appl. No. 13/787,553, filed Mar. 6, 2013, Roth et al.
U.S. Appl. No. 13/787,576, filed Mar. 6, 2013, Roth et al.

* cited by examiner

DEFENSES AGAINST USE OF TAINTED CACHE

CROSS REFERENCE TO RELATED APPLICATIONS

This application is related by subject matter to that which is disclosed in the following commonly assigned application: U.S. patent application Ser. No. 13/787,553 filed Mar. 6, 2013, entitled "SERVER DEFENSES AGAINST USE OF TAINTED CACHE," and U.S. patent application Ser. No. 13/787,576 filed Mar. 6, 2013, entitled "CACHE VALIDATION AS A SERVICE". The entirety of each application is hereby incorporated by reference herein.

BACKGROUND

Web caching is a commonly used technique implemented in web browsing. The technique involves a client temporarily storing objects downloaded from a server for later retrieval. The technique may also involve a proxy located between the client and the server and configured to temporarily store the downloaded objects. Web caching typically improves the quality of services associated with the delivery of objects to the client. The improvements include reduced bandwidth consumption, reduced server load, and reduced latency.

Web caching, however, does not typically prevent an unauthorized entity from serving tainted objects. For example, the unauthorized entity may be positioned to intercept and modify network traffic within a computing environment. In such situations, the unauthorized entity can serve the tainted objects that the client or the proxy caches. When the tainted objects are later retrieved and executed within the same or a different computing environment, the unauthorized entity can overcome security settings associated with the computing environment.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
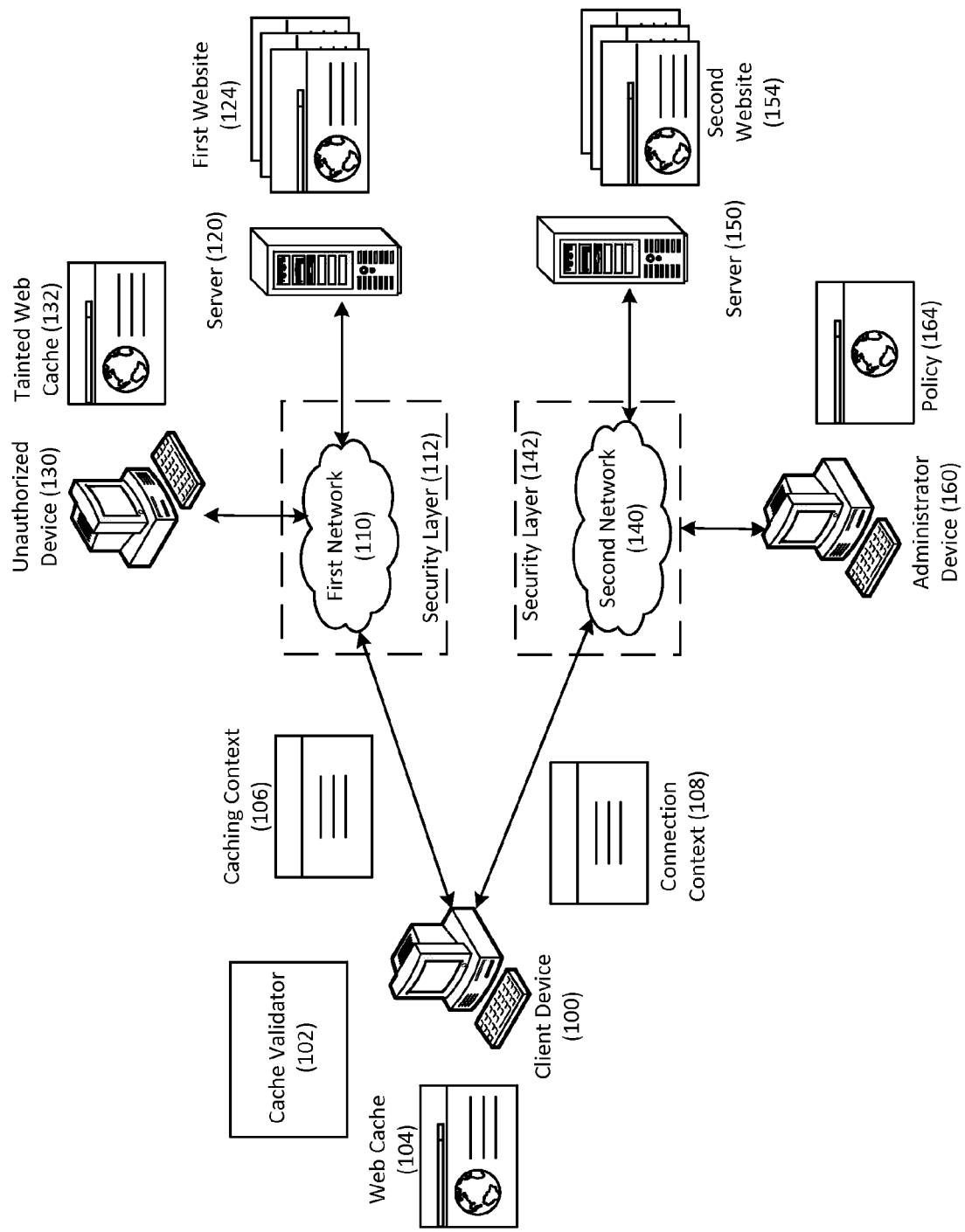
FIG. 1 illustrates a system for providing verification of cached objects.

The following detailed description is directed to technologies for validating cached objects. Generally, cached objects can be validated against parameters that are defined by the objects' author and embedded within the cached objects. The cached objects can also be validated against parameters that are defined by a client device that caches the objects. The client-defined parameters can be embedded within the cached objects or can be stored as a file associated with the cached objects and can describe a context associated with the caching. The description includes any of, for instance, information about a server from which the objects were downloaded, information about a network over which the objects were downloaded, and information about the client device.

To validate the cached objects, a policy may be employed. A policy server may collect parameters associated with the cached objects from a plurality of client devices to generate the policy. The validation of the cached objects may be executed against the policy locally on the client device or remotely on the policy server, or may be distributed between the client device and the policy server. For example, the policy server can push the policy to the client device, can provide the policy upon request to the client device, or can validate the cached objects of the client device.

The validation can be optimized to minimize costs associated with available resources and infrastructure. Such costs include, for instance, network bandwidth and resource loads. By way of example, when the client device detects a type of network that communicatively couples the client device and the policy server, the client device transmits information associated with its cached objects to the policy server and, in response, receives a validation service from the policy server.

To better understand various embodiments of the present disclosure, relevant aspects of caching are described herein below. Caching is a technique for the temporary storage of objects such as content, documents, pages, images, multimedia, video, audio, HTML files, cascading style sheets, libraries, plug-ins, JavaScript scripts, or other files downloaded when a network-based resource is visited. The objects can be used to satisfy subsequent requests to access the same or a different network-based resource.

Caching techniques can be used by various systems including a browser of a computing device, a proxy server, a content delivery network (CDN), or a search engine. For example, the browser can store objects downloaded from a visited network-based resource, such as a web-based resource or a web site, in a cache of the computing device. When the browser revisits the same or a different web site, the browser may determine whether the objects in the cache are valid or invalid. The valid objects may be reused. On the other hand, the invalid objects are not used until they are refreshed.

In the case of caching by a proxy server, the proxy server caches the objects on behalf of the computing device. For example, the proxy server can be located between the computing device and the network-based resource, typically near a network gateway. When the computing device requests the objects from the network-based resource, the proxy server delivers the objects from its cache to the computing device.

In a CDN architecture, the objects are stored in cache at multiple datacenters. When the computing device connects to a datacenter to access content, objects associated with the content are served from the cache of the datacenter.

Web crawling by a search engine can also be thought of as a caching technique. In this technique, the search engine methodically browses websites to cache objects. The search engine can satisfy the computing device's request for objects of a particular website from the cache.

Other caching techniques may also be implemented and may include forward caching and reverse caching. In forward caching, frequently accessed objects are stored on a local network for retrieval by computing devices internal to the local network without visiting an external network. As such, forward caching reduces bandwidth consumption on the external network and accelerates access of the computing devices to the objects. In reverse caching, frequently accessed objects on the local network are cached at the local network's edge for consumption by computing devices on the external network. As such, reverse caching reduces network bandwidth consumption on the local network and accelerates access of the external computing devices to the objects.

To further improve the efficiency of accessing and retrieving cached objects, the caching techniques may be implemented across multiple servers configured to store the cached objects. For example, the cached objects can be distributed across a plurality of servers located throughout a network. In another example, the servers can be located at different nodes of the network in a hierarchical fashion. The cached objects are first served from a node at a lower level in the hierarchy. If the cached objects are unavailable from the node in the lower level of the hierarchy, the cached objects are served from a node at a higher level in the hierarchy.

When multiple servers are used as described above, various protocols can be implemented in order to retrieve the cached objects from one of the servers before resorting to an external network if the cached objects are not found. These protocols allow the servers to communicate in order to locate the cached objects and include cache array routing protocol (CARP), Internet cache protocol (ICP), hypertext caching protocol (HTCP), web cache coordination protocol (WCCP), and cache digests.

As described above, the cached objects can comprise content, documents, pages, images, multimedia files, video files, audio files, libraries, plug-ins, scripts, and the like and can be used to interact with network-based resources, such as web sites, servers that host network-based applications, and the like. These objects commonly comprise software code or scripts such as hypertext markup language (HTML), JavaScript, cascading style sheets (CSS), and document-object model (DOM) files.

HTML is the main markup language for displaying web pages and other information in a browser. It allows objects to be embedded within a web page and can be used to generate interactive forms. Scripts in non-HTML languages, such as JavaScript, can also be embedded in HTML. Further, HTML enables structured documents by denoting structural semantics for text such as headings, paragraphs, lists, links, quotes and other items.

JavaScript is a scripting language that adds interactivity to HTML pages by inserting scripts into HTML pages for execution by the browser. JavaScript commonly employs jQuery which is a multi-browser JavaScript library that simplifies the scripting of HTML. JQuery's syntax allows designs of dynamic web pages and applications by simplifying rules that are executed to navigate a document, select DOM elements, create animations, handle events, develop applications, and create plug-ins. These plug-ins comprise any of, for example, Ajax helpers, webservices, datagrids, dynamic lists, XML and XSLT tools, drag and drop, events, cookie handling, and modal windows.

Cascading Style Sheets (CSS) is a style sheet language used for describing the appearance and layout of a document written in a markup language, such as HTML, XML, XHTML, and the like. CSS separates document content, typically written in the markup language, from document presentation that includes elements such as layout, colors, and fonts. This separation enables multiple pages to share formatting and a same page to be displayed in different formats.

The Document Object Model (DOM) is an application programming interface (API) for HTML XML, and XHTML data and documents. It defines the logical structure and the methods for accessing and manipulating the documents. DOM allows documents to be navigated and elements therein to be edited, deleted, or added.

When a cached object is retrieved, it is typically validated prior to being reused according to various validation techniques. These techniques mostly rely on attributes that are associated with the object prior to its caching and that are defined by an author of the object or by a network-based source from which the object is cached. For example, a designer of a web page from which the object is cached can insert a set of attributes in HTML tags of the web page, whereas the web page can apply protocols, such as hypertext transfer protocol (HTTP) 1.0 and 1.1, to define another set of attributes.

The attributes can comprise freshness and control rules that define when the cached object is valid and when it needs to be revalidated. The revalidation may comprise a browser fetching a new copy of the object or checking with a server to determine whether the cached version of the object is still authorized. The freshness attributes define a period of time in which the cached object can be used. If the period expires, the cached object becomes stale and must be revalidated. These attributes can be defined in, for example, an HTTP Expires or Last-Modified header. On the other hand, the control attributes include directives to declare what objects in a document are cacheable, modifications of the expiration mechanism, and revalidation and reload controls and can be defined in, for instance, an HTTP Cache-Control header. For example, a server can generate an entity tag (ETag) that uniquely identifies an object and can update the ETag every time the object is modified. In this way, a computing device may determine when an object in its cache is valid based on whether the cached object is associated with the most up-to-date ETag.

The above validation techniques may be insufficient in certain situations. For example, if an unauthorized third party is capable of intercepting communications between a client device and a server, the unauthorized third party may re-route requests of the client device to another computing device or modify responses from the server. In this case, the unauthorized third party may serve tainted objects to the client device, which, in turn, may cache the tainted objects in its local cache. The tainted objects may otherwise have proper validation attributes that are defined by the original author of the objects or by the unauthorized third party. Because the validation is executed against these attributes, the client device would unknowingly determine that the tainted objects in its cache are valid for reuse.

For example, the tainted objects may have a malicious script that inserts an advertisement when executed. The freshness attributes of the tainted objects may have an extended expiration date, e.g., a week from the time of caching the tainted objects. When the client device attempts to visit a web page within the extended time period, the tainted objects are determined to be valid and may be used to interact with the web page. Thus, the client device executes the malicious script and causes the advertisement to be displayed within the web page. This problem of not checking for potentially tainted objects is exacerbated when the client device moves between an insecure and secure network as described herein below.

Various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

A computing node, such as a user node, a client node, an administrator node or a server node, may be implemented on a wide variety of computing environments, such as commodity-hardware computers, virtual machines, computing clusters and computing appliances. Any of these computing devices or environments may, for convenience, be described as computing nodes. Similarly, for convenience, a computing node may be referred to as a computing device or an electronic device.

FIG. 1 illustrates one example embodiment of a system for providing verification of cached objects to minimize risks associated with using tainted objects from cache. Although the techniques are illustrated using a client-server architecture, similar techniques apply to a cache server architecture. For example, the illustrated system may implement browser, proxy, or CDN caching as described above. Likewise, although the techniques are illustrated using objects cached from websites, the techniques also apply to objects cached from any other network-based resource, such as objects associated with web-based games, objects associated with applications that access application programming interfaces (APIs) exposed by servers, and the like.

In a basic configuration, the system of FIG. 1 comprises a client device 100 that may connect to a first network 110 and then later connect to a second network 140. For example, first network 110 may be a network operated by a business, such as a coffee shop that offers network connectivity and second network 140 may be a private network, such as a corporate network. The system also comprises an administrator device 160 that may be configured to manage access of client device 100 to second network 140 and an unauthorized device 130 that may be positioned to intercept data exchange between client device 100 and a server 120 over first network 110.

Devices 100, 130 and 160 may comprise a desktop computer, a laptop computer, an electronic device, a smartphone, a tablet or any other general or specialized device capable of interacting with servers 120 and 150 over networks 110 and 140. Client device 100 may be associated with an authorized user and may cache objects accessed at servers 120 and 150, such as objects of a first website 124 hosted on server 120 and objects of a second website 154 hosted on server 150. Likewise, administrator device 160 may enable an administrator to manage the use of the cached objects by the authorized user over second network 140. Unauthorized device 130 may allow a hacker to inject tainted objects into objects cached by client device 100 over first network 110.

Servers 120 and 150 may comprise any devices suitable for interacting with devices 100, 130 and 160 over networks 110 and 140 and may be configured to provide web-based services such as hosting websites 124 and 154. For example, servers 120 and 150 may be components within a web server or components within a datacenter. In another example, servers 120 and 150 may also be the same computing device. Similarly, websites 124 and 154 may be the same website or maybe two distinct websites.

Networks 110 and 140 may comprise any type of communications networks that are suitable for providing communications and transmitting data between devices 100, 130 and 160 and servers 120 and 150, and may comprise a combination of discrete networks, which may use different technologies. For example, networks 110 and 140 may comprise a cellular network, a WiFi/broadband network, a local area network (LAN), a wide area network (WAN), a telephony network, a fiber-optic network or combinations thereof. In an example embodiment, the WiFi/broadband network may be adapted to communicate with the Internet.

Networks 110 and 140 may also be associated with security layers 112 and 142, respectively. These security layers may differ from one another and may define parameters or levels for enabling access of client device 100 to networks 110 and 140. For example, first network 110 may be an insecure network or a public network accessible to all users with minimum or no authentication. By comparison, second network 140 may be a secure network or a private network that has various security safeguards that are defined in security layer 142 and that authenticate the authorized user. The safeguards may include, for example, firewalls, encryption, authentication, credentials, communication protocols, filters, and the like. A virtual private network may be used to extend a private network's operation over a public network. Determining whether a network is secure or insecure may be based on various parameters that may include, for example, information about the network's security layer, whether it is a private or public network, and an identifier that may associate the network with a whitelist or blacklist managed by administrator device 160.

The authorized user may operate a browser on client device 100 to interact with first website 124 over first network 110. The browser caches objects of first website 124 in a cache of client device 100, shown as web cache 104 in FIG. 1. The cached objects in web cache 104 may have attributes that are defined by server 120 or by an author of first website 124 and that may be configured to allow the browser to validate the cached objects during a subsequent use.

At a later time, the authorized user may direct client device 100 to connect to second network 140. The connection may involve authenticating the authorized user based on security layer 142. When the authorized user directs the client device 100 to connect to second website 154 over second network 140, second website 154 may use the objects that were cached in associated with first website 124. As such, instead of downloading the objects, the browser may fetch and validate them from web cache 104. If the browser determines that the objects are valid, the browser may use the objects to access second website 154. If the browser determines that the objects are invalid, the browser refreshes web cache 104 by replacing the invalid objects with objects from second website 154.

As noted above, a malicious or undesired program may have been installed on a network device in first network 110 that causes the network device to intercept communications between client device 100 and server 120 and route the requests to unauthorized device 130 or cause the network device to respond to client device 100 as if it was server 120. After the communications are intercepted, the network device or unauthorized device 130 may serve tainted objects to client device 100 that are then cached in web cache 104. For example, when the browser of client device 100 attempts to connect to first website 124 over first network 110, unauthorized device 130 may spoof the browser by providing objects from an alternate website that appears to come from first website 124. As such, the browser may accept and store in web cache 104 tainted objects that may include malicious code. At a later time, when the browser connects over second network 140 to the same or another website, such as second website 154, the browser may fetch the tainted objects from web cache 104 and may unsuspectingly execute the malicious code.

To improve browser security, additional data may be associated with the cached objects in web cache 104 and used to verify whether the cached objects are trusted. For example, even when client device 100 validates the cached objects based on their freshness attributes, client device 100 may further verify the cached objects based on the additional data. If the verification indicates that the cached objects are trusted, client device 100 may allow their use. On the other hand, if the verification indicates that the cached objects are untrusted, client device 100 may disable their use and may attempt to refresh them. The additional data associated with the cached objects may be generated by a cache validator 102 operating on client device 100.

Cache validator 102 may be integrated with the browser or with an application other than the browser, or may be a standalone application, and may be configured to verify cached objects in web cache 104 as described herein below. In an example, cache validator 102 may include scripts stored in an HTTP client library, or may be provided within an application software development kit (SDK). Although the following paragraphs describe that cache validator 102 verifies the cached objects upon detecting that the browser is requesting to reuse these object objects, this verification can occur when client device 100 boots up, based on a predefined rule, or upon detection of a network condition.

In one example, cache validator 102 may associate verification information with the cached objects of web cache 104. The verification information may be in the form of metadata that describes conditions in which the objects were retrieved and cached. The metadata may be stored as a caching context 106 in web cache 104 or, alternatively, in a metadata file associated with web cache 104. For instance, the metadata file may be located in the same or a different local folder that stores web cache 104 on client device 100. Cache validator 102 can also facilitate edits to the metadata by, for example, enabling the authorized user to retrieve and annotate caching context 106 with additional verification information.

As used herein, caching context 106 generally includes a description of a context in which the objects were stored in a cache such as web cache 104. More particularly, caching context 106 may include a variety of information about first website 124, server 120, first network 110, the authorized user, client device 100, the connection between these different devices and the like. For example, an address, such as a uniform resource locator (URL) of first website 124, an internet protocol (IP) address of server 120, or a media access control (MAC) address of server 120, and a description of a digital certificate associated with first website 124 or server 120 may be included in caching context 106.

The information about first network 110 may contain an identifier of first network 110, a description about security layer 112, data about an entity or an administrator of first network 110, a geographic location of first network 110 and the like. For example, the identifier may be a service set identifier (SSID), an IP address, or a MAC address of a wireless access point associated with first network 110. The description of security layer 112 may indicate whether first network 110 is a public or private network and information about the type of authentication used by first network 110. When first network 110 is associated with an entity, such as a store or a company, an identification of the entity and its geographic location can be included in caching context 106.

Caching context 106 may also include an identifier of client device 100 such as its IP or MAC address, a description of an operating system of client device 100, and information about the browser. Likewise, the authorized user may be described in caching context 106 by using his or her user name, privileges and function. For example, caching context 106 may indicate whether the authorized user is an administrator of first network 110.

The information about the connection between the various devices captured in caching context 106 may include a trace route of the network connection between client device 100 and website 124, a latency or response time associated with computing device 100's access to website 124, and information about nodes or gateways between client device 100 and server 120. Also, caching context 106 may include a timestamp identifying the time when a particular object in web cache 104 were downloaded and a geographic location of client device 100 at that time.

When the authorized user directs client device 100 to connect to second network 140 and causes the browser to access network-based resources via second network 140, the browser may attempt to reuse previously cached objects from web cache 104. In this case, cache validator 102 can verify whether the cached objects may be trusted or untrusted based on caching context 106. For example, cache validator 102 may compare the current network conditions to the attributes stored in caching context 106. The current conditions may be stored as a connection context 108 that may include similar attributes to those stored in caching context 106. For example, when the browser connects to second website 154, connection context 108 may include information about second website 154, server 150, second network 140, client device 100, the authorized user, and information about the connection between these modules. As used herein, connection context 108 generally includes a description of a context in which cached objects from web cache 104 will be reused by client device 100. Connection context 108 can, but need not, be saved on client device 100.

Cache validator 102 may have a policy, e.g., a set of rules, that defines when the cached objects in web cache 104 should be considered trusted based on a comparison of caching and connection contexts 106 and 108. For example, the policy may define a minimum set of information that need to match between the two contexts. In one example, cache validator 102 can compare requirements of security layer 142 to requirements of security layer 112 as described in caching context 106 and connection context 108, respectively. If cache validator 102 determines that first network 110 is more secure than second network 140 (e.g., an identifier for first network 110 is stored on a whitelist whereas an identifier for second network 140 is not), cache validator 102 may declare cached objects in web cache 104 that were obtained while connected to first network 110 as trusted and enable the browser to reuse these cached objects over second network 140. In another example, cache validator 102 may determine that the authorized user was acting in an administrator function when objects were cached in web cache 104 and is currently acting as a user with limited privileges on second network 140. In such an example, the application may determine that these cached objects in web cache 104 are trusted and again enable the browser to reuse them on second network 140. These various examples are merely illustrative and other implementations may be utilized based on the information that is included in caching context 106 and that is available to cache validator 102 when client device 100 is connected to second network 140.

Various actions may be performed by cache validator 102 or client device 100 when the cached objects in web cache 104 are determined to be untrusted. For example, cache validator 102 may fetch new versions of the cached objects while connected to second network 140 or may purge web cache 104 all together and download new objects from second website 154 over second network 140. Also, cache validator 102 may also display a warning to the authorized user describing a risk associated with the untrusted objects.

Administrator device 160 may also be configured to assist cache validator 102 in verifying whether the cached objects in web cache 104 are trusted. For example, administrator device 160 may comprise a policy 164 for verifying objects based on context information. As such, administrator device 160 may receive caching context 106 from client device 100, may receive or derive connection context 108, and may compare caching and connection contexts 106 and 108 to determine whether policy 164 is met. If the policy is met, administrator device 160 may return an indication that the cached objects in web cache 104 are trusted. Otherwise, administrator device 160 may return an indication that they are untrusted. If untrusted, administrator device 160 may also instruct client device 100 to refresh the cached objects in web cache 104, may transmit new objects to client device 100 with instructions to purge and replace corresponding cached objects in web cache 104, or may direct client device 100 to a trusted server from which new objects may be retrieved.

Figure 2:
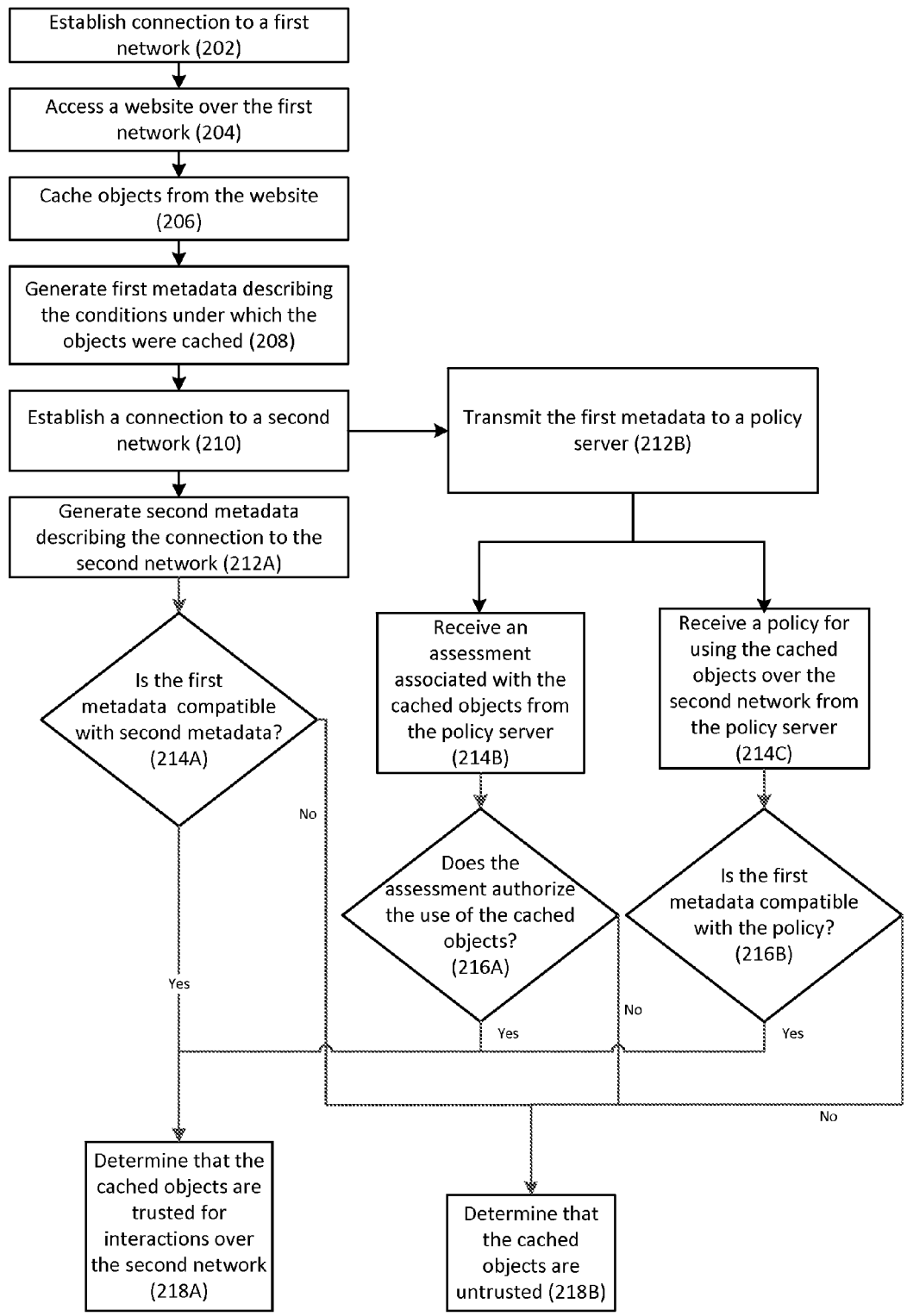
FIG. 2 is a flowchart depicting an example procedure for providing verification of cached objects.

FIG. 2 is a flowchart depicting an example embodiment of a procedure for providing verification of cached objects. Operations 202-218 may be implemented on client device 100 of FIG. 1. Operation 202 illustrates client device 100 connecting to first network 110. Operation 204 illustrates client device 100 operating the browser to access first website 124 over first network 110. Operation 206 illustrates client device 100 caching objects from one or more websites in conjunction with accessing first website 124.

Operation 208 illustrates client device 100 generating and storing a context that includes information describing conditions under which the objects were cached. For example, the information could indicate a network identifier for the first network 110, a timestamp, etc. Operation 210 illustrates client device 100 connecting to second network 140 that may be associated with a rule. The rule may require client device 100 to automatically verify objects in its web cache when the connection is established or to periodically perform such verification. Operation 210 may be followed by operation 212A or operation 212B (described in more detail below) depending on whether the verification is performed locally on the client device 100 or is distributed between client device 100 and a policy server associated with second network 140.

When the verification is performed locally on client device 100, Operation 212A illustrates client device 100 generating a context associated with the connection to second network 140. For example, the context can include an identifier for the second network 140, a timestamp indicating when the connection to the second network 140 was made, etc. Following Operation 212A, operation 214A illustrates client device 100 comparing the stored context to this generated context. Client device 100 may determine that the two contexts are compatible based on a policy. Such a policy can be embedded within cache validator 102, stored locally at client device 100, or retrieved from the policy server. Operation 214A may be followed by operation 218A when the contexts are compatible. Otherwise operation 214A may be followed by operation 218B.

Operation 218A illustrates client device 100 determining that the cached objects, e.g., objects within the cache that were obtained via the first network 110, are trusted and may be used over second network 140. Client device 100 may further validate the cached objects based on attributes embedded therein by an author of the objects. Operation 218B illustrates client device 100 determining that the cached objects are untrusted.

When the verification is distributed between client device 100 and the policy server, Operation 212B illustrates client device 100 transmitting the generated context to the policy server. The policy server may store a policy that defines requirements for determining whether cached objects are trusted or not. In one example, the policy server compares the received context to the policy and returns an assessment to client device 100. In such a situation, operation 212B may be followed by operation 214B. In another example, the policy server may return the policy or relevant sections of the policy to client device 100 based on the received context. In such a situation, operation 212B may be followed by operation 214C.

Operation 214B illustrates client device 100 receiving an indication from the policy server whether the cached objects are trusted. The instructions may include a risk or a likelihood of having malicious code inserted in the cached objects. The instructions may also authorize client device 100 to use the cached objects when determined to be trusted. If the cached objects are untrusted, the instructions may require client device 100 to fetch new objects from second website 154 or from a trusted source. Operation 216A illustrates client device 100 determining whether the received instructions indicate that the cached objects are trusted. If the cached objects are trusted, operation 216A may be followed by operation 218A. Otherwise, operation 216A may be followed by operation 218B.

Operation 214C illustrates client device 100 receiving the policy from the policy server. In such a case, client device 100 may store the policy locally. The policy may be integrated with cache validator 102. Operation 216B illustrates client device 100 comparing the stored context to the policy. Operation 216B may be similar to operation 214A. More particularly, client device 100 may determine whether a minimum set of requirements that are defined in the policy are satisfied by the stored context information. If the requirements are met, client device 100 may determine that the stored context and the policy are compatible indicating that the cached objects are trusted. Otherwise, client device 100 may determine that they are incompatible, indicating that the cached objects are untrusted. Operation 216B may be followed by operation 218A when the cached objects are trusted. Otherwise, operation 216B may be followed by operation 218B.

Figure 3:
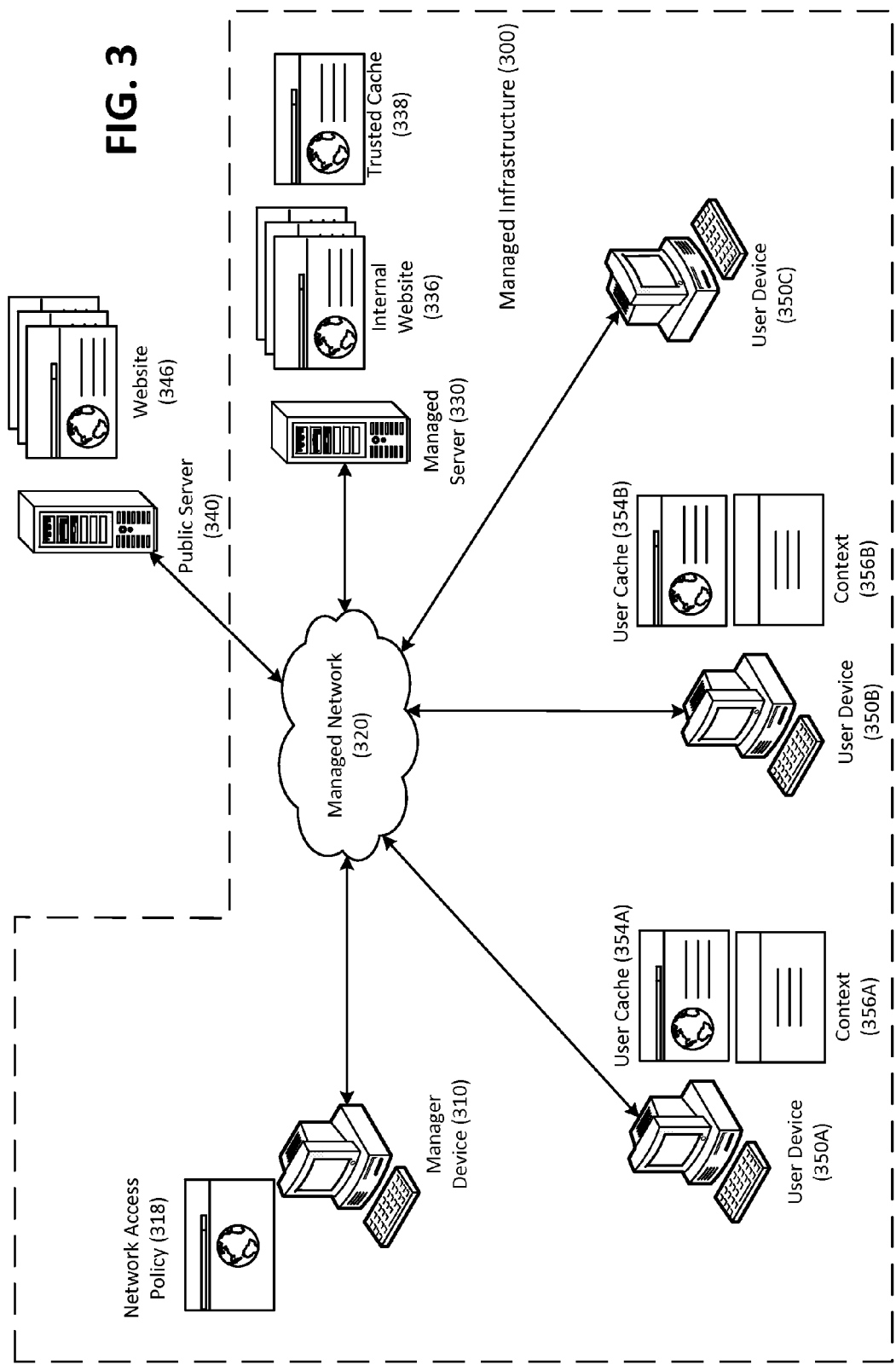
FIG. 3 illustrates a system for providing server-based verification of cached objects.

Another example of a system in which the disclosed techniques may be employed is depicted in FIG. 3. In particular, FIG. 3 illustrates one example embodiment of a system for providing server-based verification of cached objects. In a basic configuration, the system may comprise some or all elements of the system of FIG. 1 and may comprise a managed infrastructure 300 that is configured to control access of a plurality of user devices 350A-C to other components of managed infrastructure 300. For instance, a user may direct user device 350A to access data controlled by managed infrastructure 300, or to connect to a public server 340 through managed infrastructure 300 to cache objects from a website 346 hosted on public server 340.

When connected to managed infrastructure 300, user device 350A may use cached objects from user cache 354A and a context 356A to interact with network-based services internal and external to managed infrastructure 300. User cache 354A and context 356A may comprise some or all elements of web cache 104 and caching context 106 of FIG. 1, respectively. Similarly, user device 350B may also store user cache 354B and a context 356B.

To control access of user devices 350A-C to components of managed infrastructure 300, managed infrastructure 300 may comprise a manager device 310 that administers access to a managed network 320 and to a managed server 330. Manager device 310 may enable a manager to provide administrative functions that can include, for example, setting a security layer that authenticates user devices 350A-C, generating and updating a network access policy 318, and the like. Network access policy 318 may define rules that allow user devices 350A-C to connect to managed network 320 and that enable cached objects from user caches 354A and 354B to be used by applications running on user devices 350A-C. For example, the cached objects from user caches 354A and 354B may be used to interact with an internal website 336 hosted on managed server 330 and with an external website to managed infrastructure 300 such as website 346, depending on network access policy 318.

In an embodiment, managed server 330 may be configured as a cache server that hosts objects in a trusted web cache 338 for replacing the cached objects in user caches 354A and 354B when they are untrusted or otherwise unusable. For example, when user device 350A connects to the managed network 320 or connects to website 346 over managed network 320, particular objects stored in user cache 354A may be determined to be untrusted. In such a situation, objects from trusted cache 338 may be sent to user device 350A to replace the particular objects in user cache 354A. In another example, when user device 350C connects to website 346 over managed network 320, user device 350C may not have an object in its cache that is usable with respect to website 346. In such a situation, a corresponding object from trusted cache 338 can be sent to user device 350C.

To determine whether an object stored in a cache is trusted, a context associated with the object may be compared to network access policy 318. In an embodiment, network access policy 318 can be generated and updated independently of information available from user devices 350A-C. For example, the manager may define a set of rules that comply with the overall security requirements of managed network 320. In such a situation, network access policy 318 may comprise a list of trusted sources such as websites, servers, networks and computing devices. A source may be added to the list of trusted sources for a number of predetermined reasons. For example, a source may be added when the manager determines that it meets or exceeds the security requirements. As another example, a source may be added to the list of trusted sources based on an agreement between the manager and an administrator of that source. The agreement may include, for example, a certification by a third party or by an auditor of the security credentials of the source.

When user device 350A connects to managed network 320, context 356A may be analyzed with respect to network access policy 318. The analysis may be performed by manager device 310. Context 356A may comprise a plurality of elements such as an identification of one or more of website 346, public server 340, user device 350A, and a network over which an object in user cache 354A was downloaded. To determine that a particular cached object in user cache 354A is trusted, network access policy 318 may require a number of conditions from context 356A to match a number of sources from the list of trusted sources. For example, network access policy 318 may require at least one condition, all conditions, or some subset of conditions in context 356A to be found on the list of trusted sources. In another example, network access policy 318 may include a predefined threshold that is used to determine whether the cached object is trusted. Manager device 310 may determine a likelihood of having a trusted object based on the frequency of elements matched between the list of trusted sources and the context. If the likelihood is larger than the predefine threshold, manager device 310 may declare that the cached object is trusted.

Network access policy 318 can also be generated and updated based on information received from user devices 350A-C. For example, manager device 310 may receive contexts over time from user devices 350A and 350B, such as context 356A and 356B. Manager device 310 may analyze and correlate these contexts to generate a history of the conditions contained therein. The history may be saved in network access policy 318. To determine whether a particular cached object in user cache 354A is trusted, manager device 310 can compare context 356A to the history. For instance, the history may indicate that a particular public network is frequently used in caching untrusted objects. Network access policy 318 may indicate that such a network should not be trusted. Thus, when context 356A comprises an identification of this public network, manager device 310 may determine that the cached object is untrusted.

Network access policy 318 can be further generated and updated based on information received from both the manager and user devices 350A-C. For example, the manager may identify a particular network that is a likely untrusted source of untrusted objects whereas the analysis of received contexts 356A and 356B may indicate that objects cached within a timeframe from the particular network are actually tainted. As such, network access policy 318 may be updated to list the particular network as a potential source of untrusted objects and to indicate that all objects cached from the source within the time frame are untrusted.

In addition to receiving contexts 356A and 356B, manager device 310 may also receive the cached objects in user caches 354A and 354B. The received objects may be analyzed to update network access policy 318. For example, manager device 310 may determine that a particular website is popular among users based on contexts 356A and 356B. In that instance, manager device 310 may access cache objects from the popular website over managed network 320. These objects can be compared to the cached objects in user cache 354A by comparing, for example, their hashes to determine whether there are differences. If differences exist, manager device 310 may tag the cached objects in user cache 354A as suspicious and may update network access policy 318 to indicate that the popular website is suspicious.

Another technique for using hashes of cached objects includes comparing hashes received from user devices 350A-C. For example, manager device 310 may receive, from user devices 350A-C, descriptions associated with content of a particular object and descriptions associated with networks over which the particular object was cached. Each of the content descriptions may include a hash of the content and each of the network descriptions may include an identifier of the network. To determine whether the particular object cached at user device 350A is trusted, manager device 310 may compare the hash of the content received from user device 350A to the hashes of content received from user devices 350B-C and may determine that the particular object is untrusted when there are differences. Otherwise, manager device 310 may compare the identifier received from user device 350A to the identifiers received from user devices 350B-C and may determine that the particular object is untrusted when the identifier changes. Otherwise, manager device 310 may receive and compare context 356A to network access policy 318.

Independent of the technique used to generate and update network access policy 318, the policy comprises a set of rules used to determine whether a cached object is trusted or untrusted. Network access policy 318 also comprises instructions about a use of the cached object based on whether it is trusted or not. The instructions may direct a computing device to use the cached object when trusted or to flush the cached object when untrusted. To use network access policy 318, manager server 310 may share it in various ways with user devices 350A-C.

One way for sharing network access policy 318 with user devices 350A-C is to push the policy to the devices. For example, managed network 320 may be associated with a private network of a company, and user devices 350A-C may be mobile computing devices associated with employees of the company, such as laptop computers, tablets, smart phones and the like. In this example, network access policy 318 may be downloaded to the mobile computing devices when they are assigned to the employees. When network access policy 318 is updated, updates to the policy can be sent to the mobile computing devices. Further, because network access policy 318 is saved locally on the mobile computing devices, the verification of whether the cached object is trusted can be performed locally on the mobile computing devices. As such, the mobile computing devices need not transmit contexts to manager device 310 to verify the cached object.

Another way for providing sharing network access policy 318 includes transmitting the policy to user device 350A upon detection of a connection between manager device 310 and user device 350A. This transmission may also occur upon demand. For example, when user device 350A connects to managed network 320, user device 350A may request and download network access policy 318 from manager device 310.

Network access policy 318 may also not be provided to user device 350A. Instead, manager device 310 may receive and analyze context 356A against network access policy 318, and may accordingly return a service to user device 350A. The service may depend on the rules and the instructions defined in network access policy 318. When the cached object is trusted, the service may include, for instance, an indication that the object is trusted, or an authorization to use the object within managed infrastructure 300. When the cached object is untrusted, the service may include, for instance, an indication that the cached object is untrusted, an indication of a likelihood that the cached object is untrusted, instruction not to use the cached object within managed infrastructure 300, a permission to use the cached object outside of managed infrastructure 300, instructions to fetch a new object over a trusted network or from a trusted source.

As described above, the trusted source may be, for example, managed server 330 that may include trusted cache 338. When the cached object is untrusted, user device 350A may connect to managed server 330 and retrieve a copy of the object from trusted cache 338. If the copy is not available in trusted cache 338, managed server 330 can download it from a website over managed network 320.

The use of network policy 318 may also not be limited to manager device 310 and user devices 350A-C. For example, network access policy 318 may comprise instructions for reporting a likelihood of tainted objects to third parties. The third parties may comprise an auditor that assesses web securities or an administrator of a network over which the tainted objects were cached. When network access policy 318 indicates that objects cached over a particular network are tainted, network policy 318 may generate a notification that identifies the particular network, the likelihood of a network hacking or a violation of the policy and may direct manager device 310 to automatically transmit the notification to the administrator of the particular network.

Figure 4:
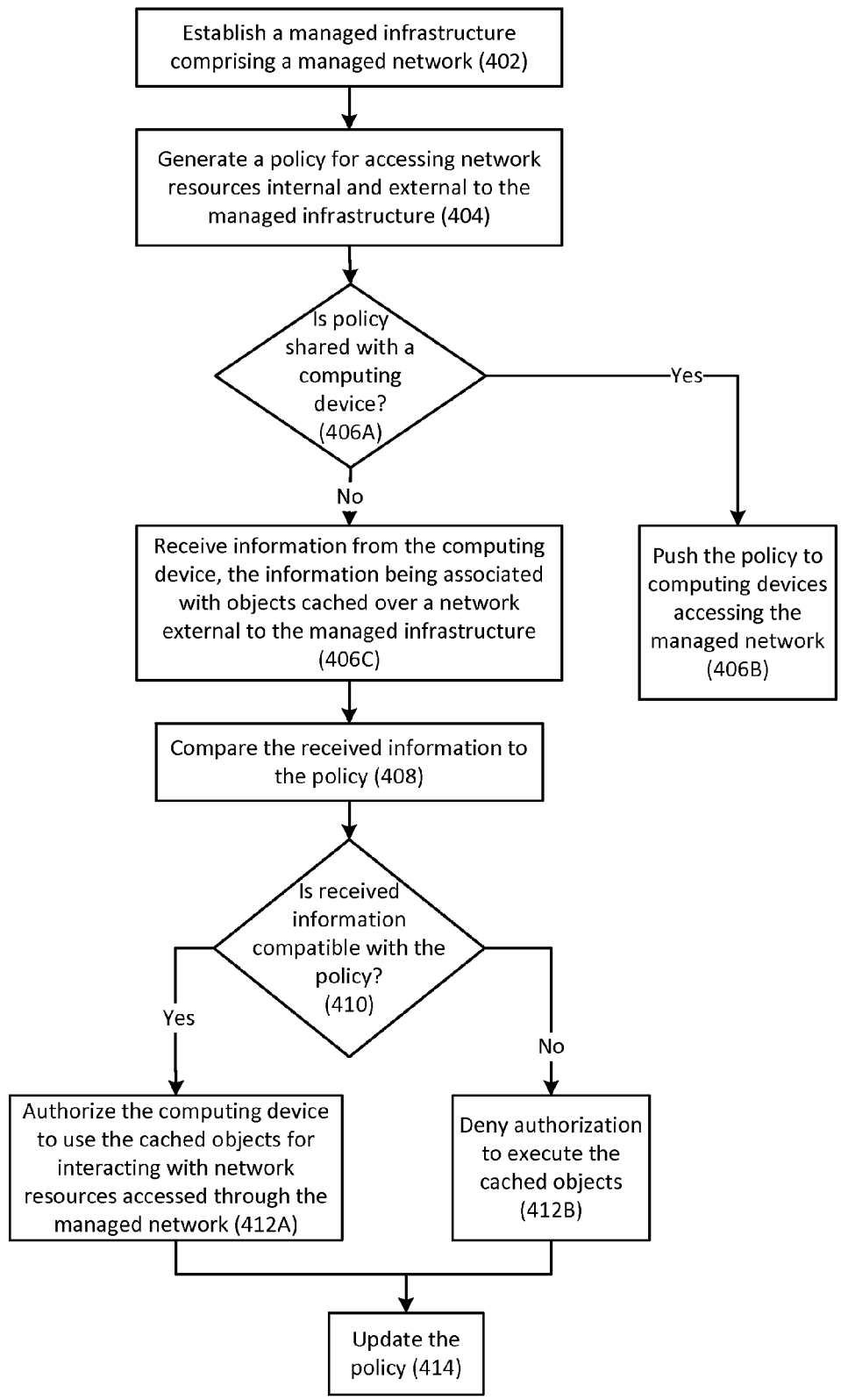
FIG. 4 is a flowchart depicting an example procedure for providing server-based verification of cached objects.

FIG. 4 is a flowchart depicting an example embodiment of a procedure for providing server-based verification of cached objects. The procedure may be performed by the system of FIG. 3. Operation 402 illustrates configuring various components of, for example, managed infrastructure 300. Operation 404 illustrates a verification service, such as manager device 310, generating a policy, such as network access policy 318. The policy may include a list of trusted and untrusted networks associated with managed infrastructure 300 and may define rules for accessing network-based resources, such as websites, internal or external to managed infrastructure 300.

Operation 406A illustrates the verification service determining whether the policy may be shared with a computing device associated with managed infrastructure 300. This determination may be based on various parameters including, for example, whether the computing device is managed by the verification service, conditions of a network connection between the verification service and the computing device, a configuration of the verification service, and the like. If the policy is shared, the verification server may push the policy to the computing device that may use the policy to locally verify cached objects in its cache as shown in operation 406B. If the policy is not shared, the verification services may verify the cached objects on behalf of the computing device and may return an indication of the verification to the computing device as shown in operations 406C-412B. Although FIG. 4 illustrates a decision under operation 406A, one skilled in the art will appreciate that operation 406A is optional. For example, one skilled in the art may implement the verification service to always verify the cached objects on behalf of the computing device.

Operation 406B illustrates the verification service transmitting the policy to the computing device. In one example, the verification service can push the policy or updates thereto to the computing device when the computing device is associated with managed infrastructure 300. In another example, the verification service may transmit relevant sections of the policy to the computing device based on a context received from the computing device. Once the policy is pushed to the computing device, it can be used locally at the computing device. On the other hand, operation 406C illustrates the verification service receiving from the computing device information about its cached objects. The information may include, for example, a list of the cached objects and contexts that describe conditions under which the cached objects were cached at the computing device.

Operation 408 illustrates the verification service comparing the received information to the policy. For example, to determine whether a cached object of the list of cached objects is trusted, the verification service may compare the cached object's context to the policy. The context may identify the computing device, a user of the computing device, and the network over which the cached object was downloaded. The policy may weigh these parameters differently. For instance, the context is declared to be compatible with the policy when both the computing device and the user are found or when only the network is identified on the list of trusted sources. As such, the identity of the network is accorded a larger weight than the individual identities of the computing device and the user. The verification service may also determine a likelihood of the cached object being untrusted based on, for example, a frequency associated with occurrences of the parameters on the list of trusted networks.

Operation 410 illustrates the verification service determining whether the cached object is trusted or untrusted based on the comparison of the context and the policy. For example, the cached object is trusted when the context is compatible with the policy or when the determined likelihood exceeds a predefined threshold. In such a case, operation 410 may be followed by operation 412A. Otherwise, the cached object is declared as untrusted and operation 410 may be followed by operation 412B.

Operation 412A illustrates the verification service transmitting instructions to the computing device indicating that its cached object is trusted. The verification service may also use the determination that the cached object is trusted as a factor in authenticating a user of the computing device by, for example, providing the computing device with access to the managed network when the object is trusted. The verification service may further authorize the computing device to use the cached object to interact with network-based resources over the managed network.

On the other hand, Operation 412B may be performed to manage the use of the untrusted cached object. When the cached object is untrusted, the verification service may indicate to the computing device that its cached object is untrusted and may execute further actions based on the rules defined in the policy. For example, the verification service may deny the computing device from accessing the managed network or from using the cached object to interact with the network-based resources over the managed network. Operation 414 illustrates the verification service analyzing the context to update the policy. For example, parameters of the context can be added to the listed of trusted or untrusted networks based on whether the cached object was found to be trusted or untrusted.

Figure 5:
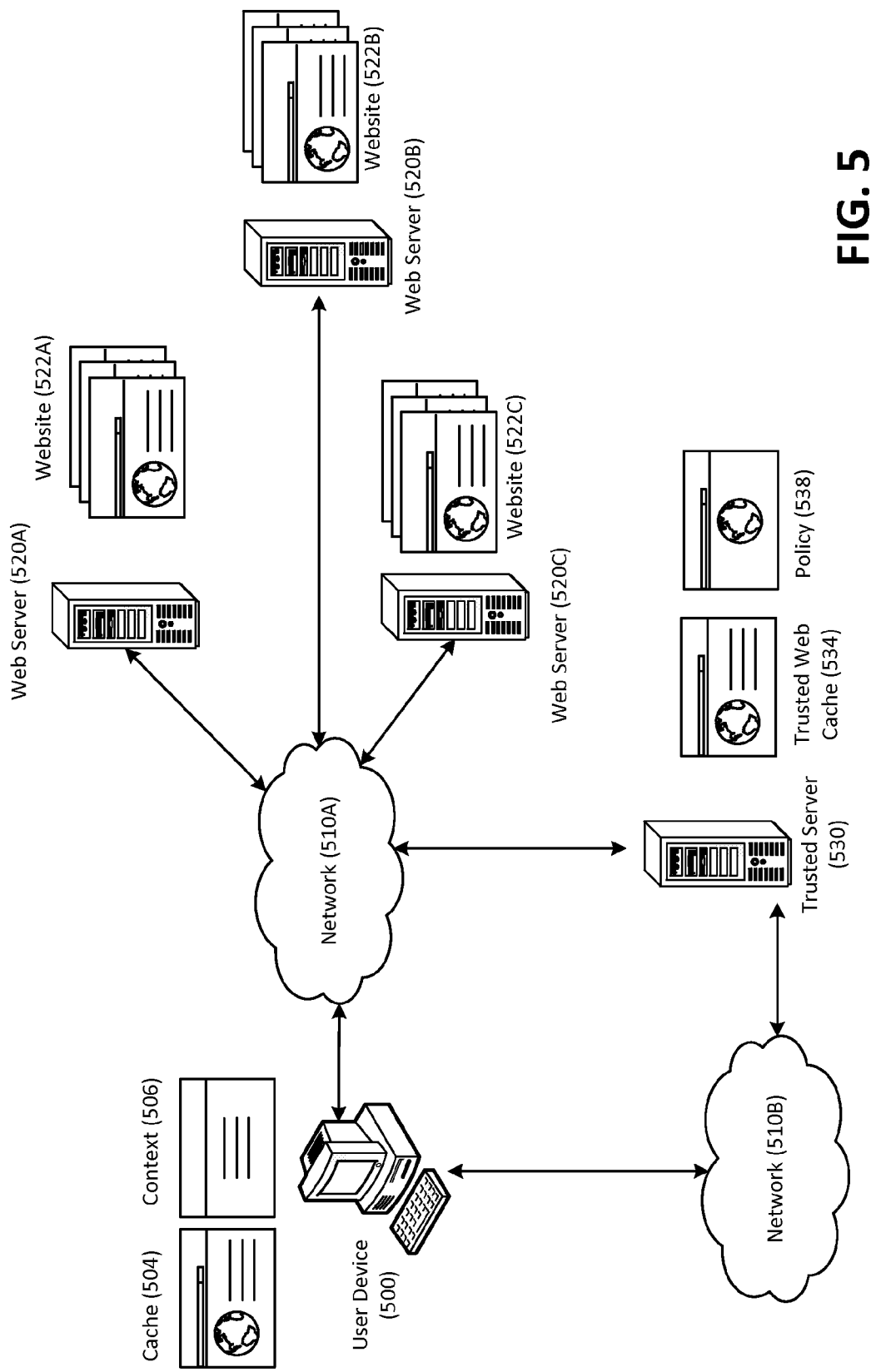
FIG. 5 illustrates a system for providing verification of cached objects as a service.

Another example of a system in which the disclosed techniques may be employed is depicted in FIG. 5. In particular, FIG. 5 illustrates one example embodiment of a system providing verification of cached objects as a service. The system may implement various policy-based techniques on a user device or on a policy server for preventing the caching of tainted objects and for verifying cached objects. In a basic configuration, the system of FIG. 5 may comprise some or all elements of the system of FIG. 3 and may comprise a user device 500 configured to access network-based resources, such as websites 522A-C hosted on web servers 520A-C, over a connection facilitated by a network 510A. User device 500 may cache objects from theses network-based resources, shown as cache 504, and may generate context 506 describing conditions of caching the objects and information about the cached objects.

The system may also include a trusted server 530 configured to verify the cached objects for user device 500 and cached objects of other computing devices. For each of the devices, trusted server 530 may use an application program interface (API) to customize and configure the verification as a service based on, for example, an account associated with the device or a user of the device. For instance, the verification service provided to a computing device may include pushing or otherwise transmitting policy 538 to the computing device. In comparison, the verification service provided to user device 500 may be different and may include, an authorization to cache objects, a determination whether the cached objects in cache 504 are trusted and a transmission of new objects when the cached objects are found untrusted as described herein below.

In order to determine whether an object is trusted before caching the object in cache 504, trusted server 530 may compare policy 538 can to a current context of user device 500 prior to the caching. The current context may describe conditions of a current connection between user device 500 and a network-based resource from which the object is to be cached. If the conditions of the current context meet policy 538, user device 500 is allowed to cache the objects in cache 504. Otherwise, user device 500 is prohibited from caching the objects. This pre-caching verification may also be performed by user device 500 if policy 538 is stored locally on user device 500. For example, policy 538 may indicate that network 510A is a trusted network, web server 520A is a trusted web server, and web server 520B is an untrusted web server. Thus, when user device 500 connects to web server 520A over network 510A and its browser connects to website 522A, the browser is permitted to cache objects of website 522A in cache 504. That is because the current context of user device 500 comprises a trusted network and a trusted web server. On the other hand, when user device 500 connects to web server 520B over network 510A and the browser connects to website 522B, the browser is not authorized to cache objects of website 522B in cache 504. That is because the current context of user device 500 comprises an untrusted web server.

On the other hand, to verify whether an object that has already been cached in cache 504 is trusted, trusted server 530 may compare the context associated with the cached object, such as context 506, to policy 538. This type of verification can be performed in real-time, periodically, or at time intervals. In an example, user device 500 may be configured to automatically request the verification service from trusted server 530 when the object is cached. In another example, user device 500 can be configured to periodically request the verification service from trusted server 530 to verify the cached object. Similarly, the user account managed at trusted server 530 can be configured to periodically trigger trusted server 530 to verify the cached object in cache 504. If context 506 has not already been received by trusted server 530 prior to the trigger, trusted server 530 may automatically request context 506 from user device 500. In yet another example, trusted server 530 may request user device 500 at time intervals to verify the cached object and to transmit a report of the verification to trusted server 530. If user device 500 fails to verify the cached object, trusted server 530 may execute additional actions such as requesting user device 500 to transmit context 506 or limiting access of user device 500 to a managed infrastructure.

A time interval associated with the service for verifying cached objects in cache 504 can be derived from parameters associated with user device 500 and trusted server 530. The parameters may comprise a time of day, an identification of a network, an available bandwidth, a data cost, an idle resource at user device 500, a geographic location of user device 500, an available resource at trusted server 530, and the like. The parameters may also be associated with a change in a network connection between user device 500 and trusted server 530. The change may be associated with a transition from a metered network (e.g., cellular) to an unmetered network (e.g., WiFi), a change of network connectivity, the reaching of a particular time window, a change in network usage rates (e.g., rates of an off peak period and of a peak period), and the like.

For example, the browser at user device 500 may be configured to transmit context 506 to trusted server 530 every night between 12:00 am and 4:00 am. The user account may be configured to trigger trusted server 530 to request context 506 from user device 500 when trusted server 530 detects that a specific network, such as network 510B, connects user device 500 thereto. User device 500 may transmit context 506 to trusted server 530 when a bandwidth greater than, for example, 10 Mbps is detected by user device 500. If user device 500 is associated with a cellular plan that has a data size limit and if the limit is reached, user device 500 may transmit context 506 to trusted server 530 only when a WiFi network is detected in order to reduce the data transmission cost. The time interval can be also set such that, when user device 500 determines that no data is queued for transmission, user device 500 may transmit context 506 to trusted server 530. Further, user device 500 can be configured to transmit context 506 when user device 500 detects that it is within a certain range of a predefined access point. Trusted server 530 may also detect that a resource thereat is available and, may allocate that resource to user device 500, and may instruct user device 500 to transmit context 506. These various examples are merely illustrative and other implementations may be utilized.

Figure 6:
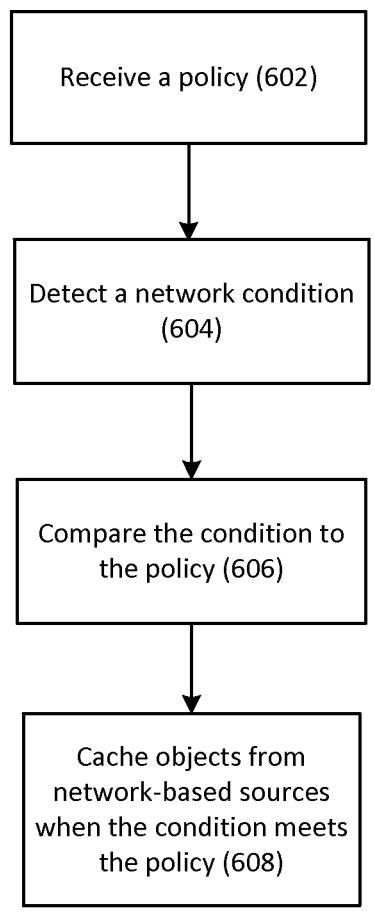
FIG. 6 is a flowchart depicting an example procedure for verifying objects before caching it as a service.

FIG. 6 is a flowchart depicting an example embodiment of a procedure for verifying an object before caching it in cache 504 of FIG. 5. The procedure may be performed by the system of FIG. 5. Operation 602 illustrates a computing device, such as user device 500, receiving a policy or updates to the policy from a trusted source, such as trusted server 530. Operation 604 illustrates the computing device establishing a connection to a server over a network and accessing a network-based resource, e.g., a website hosted on the server. The computing device may determine a parameter associated with the connection such as an identity of the network, the server, or the website. Operation 606 illustrates the computing device comparing the determined parameter to the received policy. The comparison may comprise, for example, determining whether the parameter matches a trusted condition listed in the policy. If there is a match, the parameter is tagged as being compliant with the policy. Otherwise, the parameter is tagged as being non-compliant. Operation 608 illustrates the browser caching an object associated with the website when the parameter is tagged as compliant. When the parameter is tagged as non-compliant, the browser avoids caching the object.

Figure 7:
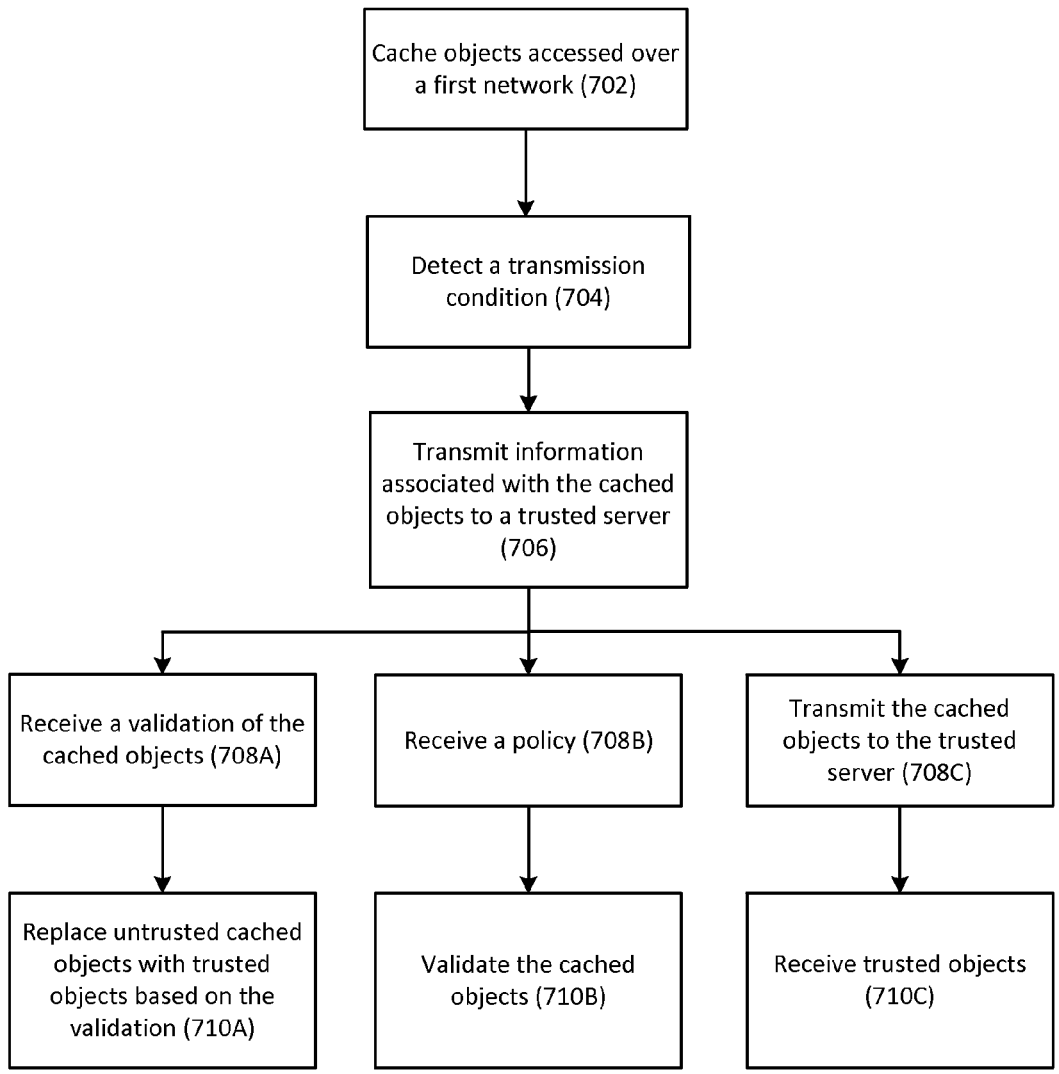
FIG. 7 is a flowchart depicting an example procedure for verifying cached objects as a service.

FIG. 7 is a flowchart depicting an example embodiment of a procedure for verifying an object that has already been cached in cache 504 of FIG. 5. The procedure may be performed by the computing device of FIG. 6. Operation 702 illustrates the computing device generating a context describing the parameters associated with the connection of the computing device to the network-based resource from which the object is cached. Operation 704 illustrates the computing device detecting a condition associated with transmitting data to the trusted source. The condition may be a time-based, connection-based, resource-based, or account-based condition.

Operation 706 illustrates the computing device determining that the condition is met and transmitting the context to the trusted source. Operation 706 may be followed by operation 708A, operation 708B, or operation 708C depending on an account associated with the computing device. Operation 708A illustrates the computing device receiving verification whether the cached object is trusted from the trusted source. The verification may comprise an indication whether the cached object is trusted or untrusted and other information and actions related to the indication. Operation 710A illustrates the computing device deleting and replacing the cached object with a new object when the cached object is found untrusted. The computing device may also use the cached object when it is found to be trusted.

Operation 708B illustrates the computing device receiving the policy or updates to the policy from the trusted source. The policy may comprise rules for validating the cached object based on the context associated with the cached object. Operation 710B illustrates the computing device comparing the context to the policy. If the context is compliant with the policy, the cached object may be found to be trusted. Otherwise, the cached object may be found to be untrusted.

Operation 708C illustrates the computing device transmitting the cached object to the trusted source. The trusted source may analyze the cached object to determine whether the cached object contains tainted code. Operation 710C illustrates the computing device receiving a trusted object from the trusted source. For example, the trusted source may replace an untrusted cached object with a trusted object and transmit the trusted object to the computing device. The computing device may use the trusted object to interact with the network-based resource.

Figure 8:
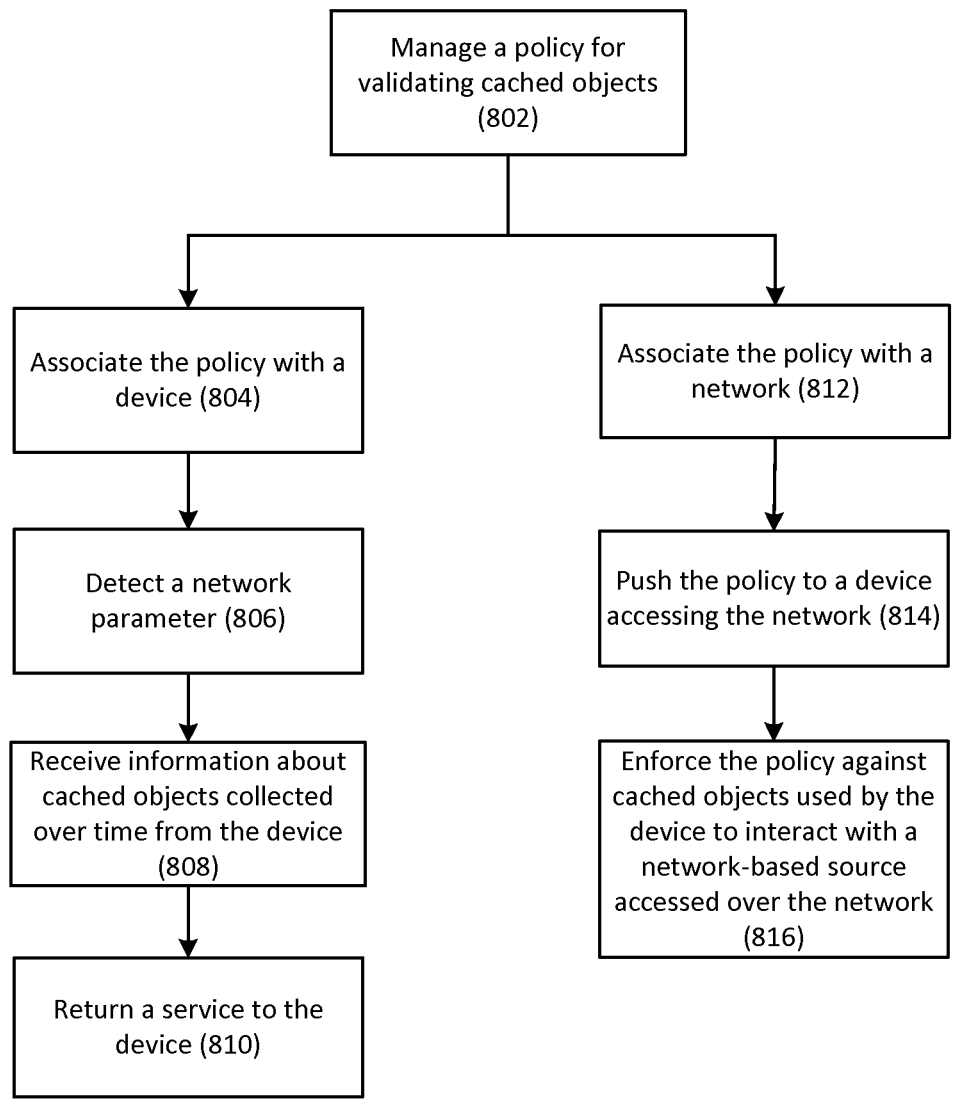
FIG. 8 is a flowchart depicting another example procedure for verifying cached objects as a service.

FIG. 8 is a flowchart depicting another example embodiment of a procedure for verifying an object that has already been cached in cache 504 of FIG. 5. The procedure may be performed by the trusted source of FIG. 6. Operation 802 illustrates the trusted source generating and updating the policy used to verify whether the cached object is trusted. Operation 802 may be followed by Operation 804 or Operation 812 depending on whether the policy is associated with the computing device or with a network that the trusted source manages.

Operation 804 illustrates the trusted source associating the policy with the computing device based on, for example, an account associated with the computing device and managed at the trusted source. Operation 806 illustrates the trusted source determining a condition associated with transmitting data to the computing device and initiating the verification of the cached object based on the determined condition. Operation 808 illustrates the trusted source receiving the context from the computing device when the verification is initiated. Operation 810 illustrates the trusted source returning a service associated with the verification of the cached object to the computing device based on a comparison of the received context and the policy. The service may include, for example, instructions to the computing device to retrieve a new object when the cached object is untrusted.

When the policy is associated with the network that the trusted source manages, Operation 812 illustrates the trusted source associating the policy with the network and enforcing the policy against the computing device when connected to the network. Operation 814 illustrates the server transmitting relevant sections of the policy to the computing device upon detecting the connection of the computing device to the network. Operation 816 illustrates the server enforcing the policy against a use of the cached object by the computing device to access and interact with the network-based resource over the network. For example, the trusted source may require the computing device to provide a confirmation that the cached object was verified based on the policy.

In addition to validating an object in a cache of a computing device based on attributes associated with the object and to verifying whether the object is trusted based on a context associated with the object and a policy as described above, a service can be configured to provide such validation and verification while optimizing data and bandwidth usages at the computing device. For example, the computing device may maintain a summary of cached objects and of attributes associated with the cached objects. The computing device may use the summary to manage the service based on bandwidth requirements. For instance, when the summary indicates that a cached object is no longer usable based on its freshness attribute, the computing device may determine a favorable network condition and may refresh the cached object based on that condition. This and other techniques for optimizing data and bandwidth usages are described in FIGS. 9-12. More particularly, FIG. 9 illustrates one example embodiment of a system for optimizing device-based services.

Figure 9:
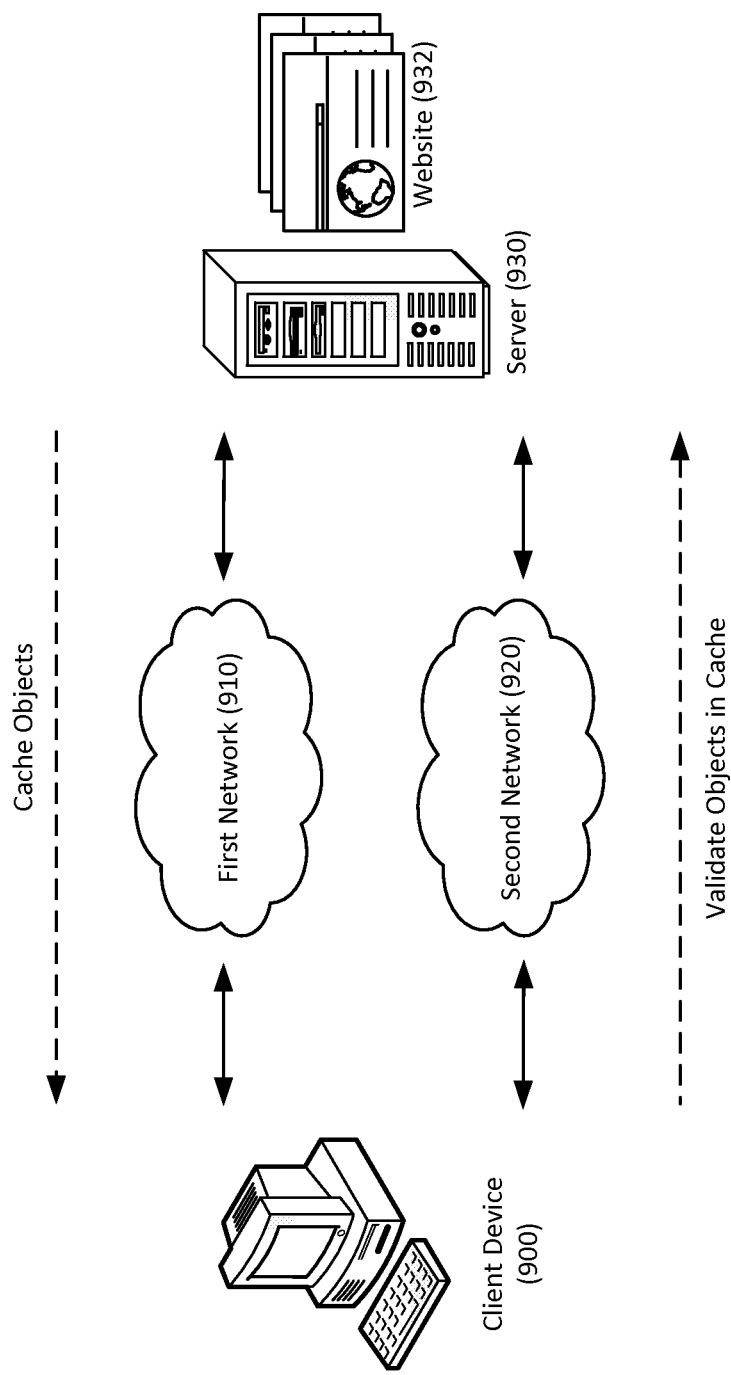
FIG. 9 illustrates a system for providing device-based validation of cached objects as a service.

The system of FIG. 9 may comprise a client device 900 in communication with a server 930 over a first network 910. Client device 900 may be configured to manage a service for validating objects in its cache based on available resources and infrastructure. More particularly, client device 900 may store in its cache objects from a network-based resource, such as a website 932 hosted on server 930, over first network 910. As such, the cache may comprise objects associated with various attributes such as freshness attributes that define a period of time in which the objects are usable.

To maintain the usability of the objects, client device 900 may operate an application, such as a browser, configured to validate the objects. In an example, the application may access the cache of client device 910 and maintain a list of the objects therein. The list may include descriptions or hashes of the objects, the attributes, and addresses of network-based resources from which the objects were cached. To optimize the data and bandwidth usages, the application may also include rules that define parameters for validating the objects. The rules may be time and resource based. For example, time-based rules may require the application to validate only objects in the cache that have expired or that will expire in a certain timeframe, such as in a day, a week, and the like. These rules may also define a frequency and a time of day when the validation can occur to minimize network loads. For example, the application may be configured to periodically refresh or replace unusable objects between midnight and 2:00 am over first network 910.

The resource-based rules may relate to the underlying infrastructure of the system of FIG. 9. More particularly, these rules may depend on the resources available at client device 900 and on the connection between client device 900 and server 930. By way of example, client device 900 may be associated with a data plan that limits the amount of the data that client device 900 may receive or send over first network 910 on a monthly basis. This data plan may be an input to the resource-based rules that may allocate the validation of the cached objects accordingly. For example, when the application detects that the limit has been reached for a certain month, the application may not refresh the cached objects over first network 910. Instead, the application may utilize a second network 920 to refresh the cached objects or may delay the refreshing over first network 910 until the next month. On the other hand, if the application detects that the limit is not reached but that the data plan is about to expire for that certain month, the application may refresh the cached objects over first network 910 even when the cached objects have not expired yet. Other device-based rules may also be implemented. For instance, when client device 900 is performing a function that is independent of refreshing the cached objects, such as placing a voice call to another device, client device 900 may determine an impact of performing the refresh on the quality of service associated with this function and may reschedule the refresh based on the impact.

Similarly to the device-based rules, connection-based rules may be configured to optimize bandwidth, cost, and security. For example, these rules may dictate a certain network throughput to allow a fast validation. As such, when first network 910 does not meet this throughput requirement because, for instance, it is a third generation (3G) cellular network, the application may validate the cached objects when a faster network is detected, such as second network 920 that may be a fourth generation (4G) cellular network. In another example, the rules may require the use of an unmetered network to minimize the data cost associated with the validation of the cached objects. For example, when first network 910 is a cellular network and second network 920 is a WiFi network, the application may not validate the cached objects until client device 900 connects to second network 920. In yet another example, the rules may provide a secure validation by requiring a trusted network over which the validation of the cached objects may be performed. For instance, when first network 910 is a public network and second network 920 is a private network, the application may refresh the cached objects only when client device 900 is connected second network 920.

Figure 10:
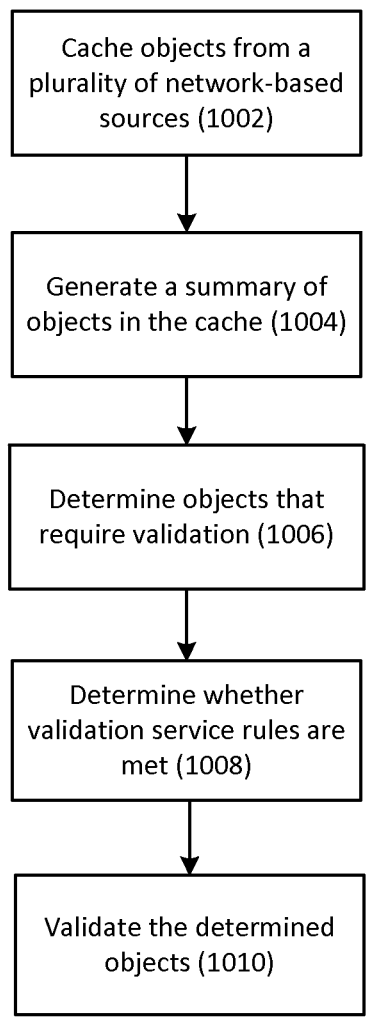
FIG. 10 is a flowchart depicting another example procedure for providing device-based validation of cached objects as a service.

To illustrate this optimization associated with the validation of the cached object, FIG. 10 describes one example embodiment of a procedure that can be performed by client device 900 of FIG. 9. Operation 1002 illustrates client device 900 connecting to a plurality of servers, including server 930, over first network 910 and caching objects from a plurality of network-based resources, including website 932. Operation 1004 illustrates client device 900 generating a summary of the objects contained in its cache. Operation 1006 illustrates client device 900 determining that a subset of the objects needs to be validated based on attributes included in the summary. Operation 1008 illustrates client device 900 determining whether time and resource based rules are satisfied to validate the subset of objects. This determination may be based on information that includes, for example, a time of day, available resources at client device 900, and the network that client device 900 is connected to. Operation 1010 illustrates client device 900 refreshing the subset of objects from the same or different network-based resources when the time and resource based rules are met. For example, client device 900 may retrieve the addresses of the network-based resources from the summary, connect to these network-based resources, check whether the objects are still valid or whether updates thereto are needed, download any needed new objects or updates to the cache of client device 900, and update the attributes and the summary.

Figure 11:
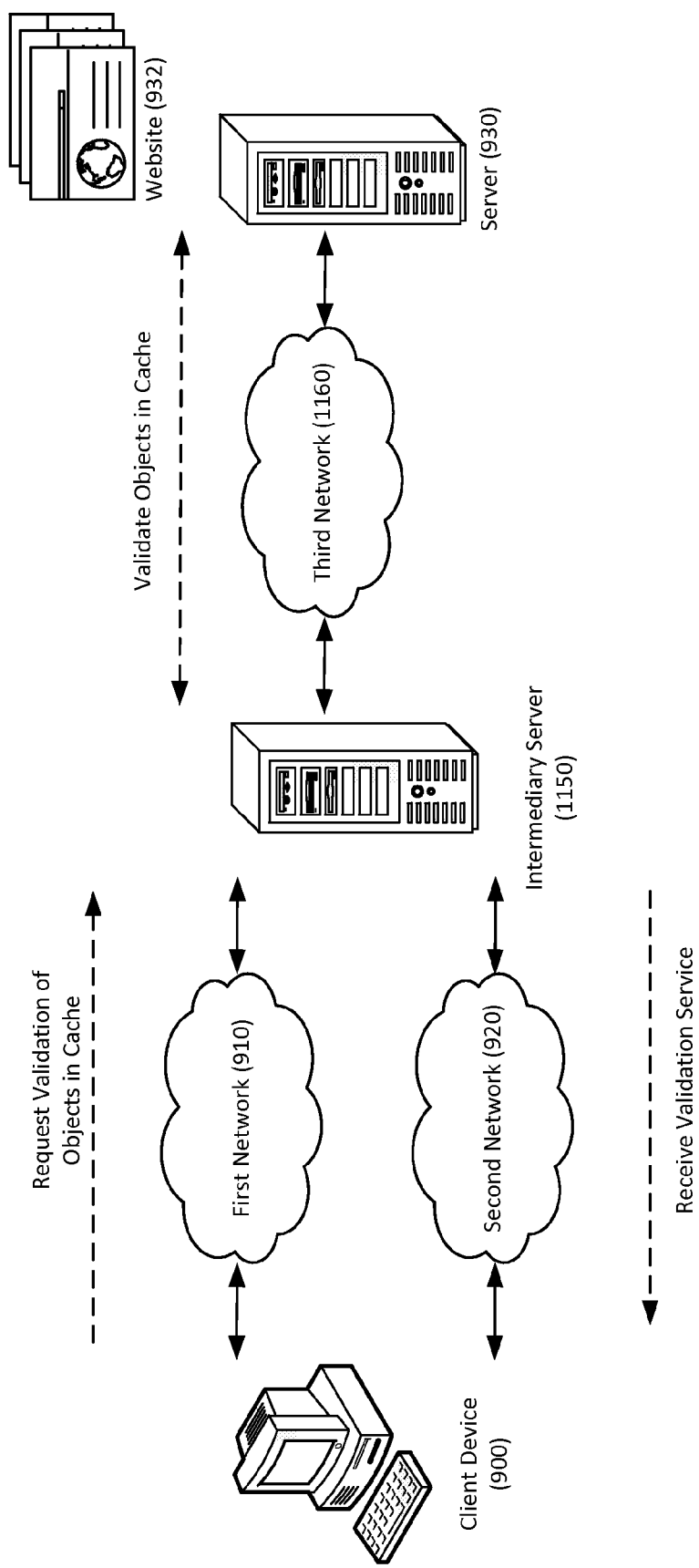
FIG. 11 illustrates a system for providing server-based validation of cached objects as a service.

The validation of cached objects may be further optimized by using an intermediary server located between client device 900 and server 930. More particularly, the intermediary server may be a cache server, such as a proxy or CDN server, may serve cached objects to client device 900, and may manage some or all aspects of the cached objects of client device 900. Such architecture may reduce the cost, resource, and bandwidth usage and may improve the security of client device 900. For example, instead of validating the cached objects by committing various resources and using bandwidth to connect to a plurality of network-based resources, client device 900 needs only to request the validation from the intermediary server. In turn, the intermediary server may connect to the plurality of network-based resources or to other network-based resources to refresh the cached objects, and return the refreshed objects to client device 900. FIG. 11 provides one example embodiment of a system for providing server-based validation of the cached objects that takes advantage of this architecture. As shown in FIG. 11, the intermediary server is configured as a cache server 1150 that may cache and serve objects to client device 900 over first network 910 or second network 920. Client device 900 may, in turn, cache the served objects in its cache.

More particularly, cache server 1150 may connect to server 930 over a third network 1160 to cache objects from a network-based resource, such as website 932. The cached objects may be transmitted from cache server 150 to client device 900 that may then display website 932. Server 1150 may be further configured to monitor attributes associated of the cached objects and to validate the cached objects based on the attributes. The validated objects may be transmitted to client device 900 depending on time and resource based rules similar to what is described herein above. The various features of the system of FIG. 11 are described in more detail herein below.

In an example, cache server 1150 may be associated with a network-based service and may be configured to support a split-architecture that distributes browser functionalities (e.g. connecting to website 932, retrieving HTML and JavaScript codes, processing the retrieved codes, and rendering website 932) between cache server 1150 and the browser of client device 900. This functionality distribution may decrease the time it takes to load and render network-based resources, e.g., websites, and may reduce resource and power consumption at client device 900. Further, the split-architecture may be implemented on the server side, for example, as a virtual machine that is instantiated and operated on cache server 1150 and that enables all the browser functionalities. On the device side, the browser of client device 900 may embed a browser engine, such WebKit, to render the network-based resources and may utilize a networking protocol, such as HTTP 2.0 and SPDY, to reduce load time and improve security. When the browser requests objects of website 932 and other network-based resources, the browser may decide which functionalities are to be operated locally on client device 900 and which are to be operated remotely on the virtual machine hosted on cache server 1150. In turn, cache server 1150 may funnel the requests, connect to website 932 and the other network-based resources, retrieve the requested objects, and process the objects based on the functionality distribution. Cache server 1150 may also cache the retrieved objects. The cached objects can be pushed to client device 900, transmitted to client device 900 upon request, or made available by, for example, storing the cached objects on a network-based resource, such as a webpage hosted on cache server 1150, and sending a corresponding link to client device 900.

To validate the cached of client device 900 based on the intermediary server architecture of FIG. 11, various techniques may be implemented and may or may not include requests from client device 900 to cache server 1150 for validating the cached objects. In a first technique, client device 900 may request cache server 1150 to validate the cached objects in client device 900's cache. For example, the application operated on client device 900 may generate a summary associated with the cached objects in its cache as previously described. The application may include data based on the summary in a request sent to cache server 1150 for validating the cached objects. The request may be customized to reduce bandwidth usage by taking advantage of the cache that is maintained at cache server 1150. For example, the request need not include the cached objects to be validated. Instead, the request may include the summary or information based on the summary. The information may include a description, checksum, or hash of client device 900's cached objects that need to be validated. In another example, the application may generate a hash of the summary or of client device 900's cache and may include this information in the request. Further, depending on time and resource based rules associated with client device 900 and with the connection to cache server 1150, the request may be transmitted to cache server 1150.

In turn, cache server 1150 may receive the request and determine the cached objects that need to be validated and the network-based resources that can be used to refresh the cached objects. This determination may depend on the data included in the request. For example, when the request identifies the cached objects, cache server 1150 may update a list that tracks objects that need to be validated with this information. In another example, when the request includes a hash of the cache of client device 900, cache server 1150 may process the hash, identify the associated objects, access its cache, determine which objects are expiring and the network-based resources from which the expiring objects can be refreshed, and add this information to the list.

Another technique for validating the objects does not involve a request from client device 900 but, instead, takes advantage of the cache of cache server 1150. Because the cached objects of client device 900's cache are also cached at and served from cache server 1150 to client device 900, cache server 1150 may monitor and determine the objects that have been transmitted to client device 900 and that need to be validated. This monitoring may be based on, for example, the freshness attributed of the transmitted objects and may include maintaining a summary similar to the summary generated by the application of client device 900. When an object needs to be refreshed, cache server 1150 may determine a network-based resource that can be used to refresh the object and may add an identifier of the object and of the network-based resource to the list that tracks the objects that need to be validated.

Regardless of which of the two techniques is used to initiate the validation of the objects, cache server 1150 may validate the objects identified on the list by connecting to the associated network-based resources, checking whether the objects are still valid or whether updates thereto are required, downloading new objects or updates to the cache of cache server 1150, and updating any summary of the cache. A service may be returned to client device 900 based on the validated objects and depending on the time and resource based rules. The service may include transmitting the validated objects to client device 900. The transmission may include pushing the validated objects to client device 900 or sending a link to a webpage hosted on cache server 1150 and that includes the validated objects. In this latter example, client device 900 may retrieve the validated objects from the webpage by following the link. Additionally, to further save bandwidth, when an object has expired but is determined to still be valid, cache server 1150 need not transmit the updated object to client device 900. Instead, cache server 1150 may transmit instructions to client device 900 to update the freshness attribute of the object.

In yet another technique for validating the cached objects, server 1150 may not refresh the objects. Instead, cache server 1150 may transmit the list that tracks the objects that need to be validated to client device 900 depending on the time and resource based rules. In turn, client device 900 may process the information from the list, connect to the listed network-based resources, and refresh the associated objects from these network-based resources.

In addition to enabling the validation of the cached objects based on the time and resource based rules, other rules may be implemented. For example, cache server 1150 may maintain accounts associated with client device 900 and other devices. These accounts may mandate the frequency, the time, and the rules for validating the cached objects of each client device. For instance, client device 900 may be associated with an account that requires cache server 1150 to validate objects cached from website 932 on a daily basis and objects cached from another website on a monthly basis. These account rules may be coupled with time-based rules that require the validation of the objects to occur at 10:00 pm. As such, cache server 1150 may transmit validated objects associated with website 932 to client device on a daily basis at 10:00 pm and validated objects associated with the other website on the first Monday of each month at 10:00 pm.

Figure 12:
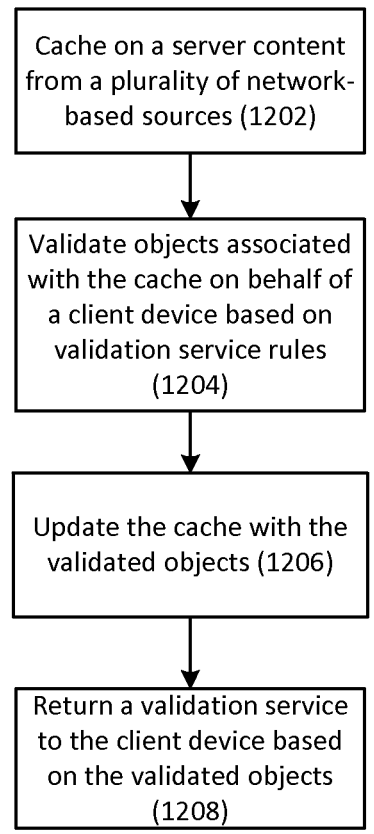
FIG. 12 is a flowchart depicting another example procedure for providing server-based validation of cached objects as a service.

To illustrate the bandwidth optimization associated with the validation of the cached objects when an intermediary server is used, FIG. 12 describes one example embodiment of a procedure that can be distributed between cache server 1150 and client device 900 of FIG. 11. Operation 1202 illustrates cache server 1150 connecting to network-based resources, including website 932, over third network 1160 and caching objects from these network-based resources. The cached objects can be served to client device 900. Operation 1204 illustrates cache server 1150 validating the cached objects. This validation may be based on a request received from client device 900 or may be based on monitoring attributes of the objects served to client device 900 and may take into account time, resource, and account based rules. The validation may also include determining which objects from the cache of cache server 1150 are no longer usable and connecting to network-based resources to refresh the determined objects. Operation 1206 illustrates cache server 1150 updating its cache with validated objects and updating a summary related to the cache with information about the validated objects. Operation 1208 illustrates cache server 1150 returning a service based on the validated objects to client device 900. The returned service may include transmitting the validated objects, a link to a network-based resource from which client device 900 may retrieve the validated objects, or information to update attributes of the cached objects cached of client device 900's cache. This transmission may also take into account the time, resource, and account based rules. As such, cache server 1150 may be configured to act as a single point in the system that client device 900 interfaces with to validate the cached objects of client device 900's cache.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of using a browser cache when accessing a first server node by way of at least two different networks, the method comprising:
    storing, in a cache accessible by a browser, an object received in connection with content received from a website, the object received via a first network;
    generating data associated with the object, the data being indicative of attributes of the first network;
    maintaining the data indicative of the attributes of the first network associated with the object;
    determining that the data indicative of attributes of the first network meets at least one condition for using the object to interact with content via a second network; and
    using the object to interact with content accessed over the second network based at least in part on the determination.

2. The method of claim 1 further comprising:
    determining that the object is untrusted when the data indicative of the attributes of the first network fails to meet the at least one condition.

3. The method of claim 1, wherein the data indicative of the attributes of the first network comprises metadata, wherein the metadata indicates that the object was received via the first network.

4. The method of claim 3, wherein the metadata comprises at least one of an identifier of the first network, a security level associated with the first network, an authentication method for connecting to the first network, geographical information associated with the first network, a time when the website was accessed via the first network, an address of the website, a certificate presented by the web site, an address of a gateway used in accessing the web site, trace route information associated with accessing the website, latency information associated with accessing the website, or information associated with an author of the object.

5. A non-transitory computer-readable storage medium bearing instructions for using cached objects that, upon execution on a computing node, cause the computing node to at least:

cache data associated with a first network;
associate with the cached data information related to the first network; and
determine whether the cached data can be used over a second network, the determination being based at least in part on the associated information and a policy for using cached data over the second network.

6. The non-transitory computer-readable storage medium of claim 5, wherein the cached data is used by a browser operating on the computing node in connection with the second network.

7. The non-transitory computer-readable storage medium of claim 5 further comprising instructions that, upon execution on the computing node, cause the computing node to invalidate the cached data for use in connection to a network-based resource when accessed from the second network.

8. The non-transitory computer-readable storage medium of claim 5, wherein the cached data comprises a library for interacting with a network-based resource, and wherein the instructions to determine whether the cached data can be used over the second network comprise instructions to:
determine that the library is trusted based at least in part on a comparison between the associated information and the policy; and
execute the library when interacting with the network-based resource over the second network.

9. The non-transitory computer-readable storage medium of claim 5, wherein the associated information comprises a description of the first network and an address where the cached data was obtained from.

10. The non-transitory computer-readable storage medium of claim 9, wherein the description of the first network comprises a service set identifier of the first network.

11. The non-transitory computer-readable storage medium of claim 9, wherein the address comprises a uniform resource locator of a web site from where the cached data was obtained.

12. A computing device for using a cache, the computing device comprising:
a memory bearing instructions that, upon execution on the computing device, cause the computing device to at least:
connect to a network-based resource over a first network;
download at least one object associated with accessing network-based content from the network-based resource;
associate information related to the at least one object with information related to the first network; and
determine whether to reuse the at least one object when accessing network-based content over a second network, the determining being based at least in part on the associated information and a requirement related to the second network.

13. The computing device of claim 12, wherein the first network is determined to be an insecure network, and wherein the second network is determined to be a secure network.

14. The computing device of claim 13, wherein the first network is determined to be an insecure network when the first network is a public network, and wherein the second network is determined to be a secure network when the second network is a private network.

15. The computing device of claim 13, wherein the second network is accessed via a virtual private network.

16. The computing device of claim 12, wherein the object is a library.

17. The computing device of claim 12, wherein the associated information comprises metadata, wherein the metadata comprises a description of a connection to the network-based resource via the first network, and wherein the description comprises a context associated with the connection.

18. The computing device of claim 17, wherein the metadata is stored in a web cache.

19. The computing device of claim 17, wherein the context comprises information associated with the first network, and wherein the information comprises an identifier of the first network.

20. The computing device of claim 17, wherein the context comprises information associated with the network-based resource, and wherein the information comprises an address of the network-based resource.

21. The computing device of claim 17, wherein the context comprises any of a security level associated with the first network, an authentication method for connecting to the first network, geographical information associated with the first network, a time when the network-based resource was accessed via the first network, an address of the network-based resource, a certificate presented by the network-based resource, an address of a gateway used in accessing the network-based resource, trace route information associated with accessing the network-based resource, or latency information associated with accessing the network-based resource.

22. A computing node comprising:
a memory bearing instructions that, upon execution on the computing node, cause the computing node to at least:
receive, from a client device, information associated with an object in a cache of the client device, the information being indicative of a network over which the object was obtained;
determine whether the object is authorized to be used to access network-based content based at least in part on the information indicative of the network over which the object was obtained; and
provide a response based at least in part on the determination to the client device.

23. The computing node of claim 22, wherein the cache is a cache for a browser or an application.

24. The computing node of claim 22, wherein the information includes a hash of the object.

25. The computing node of claim 22, wherein the information identifies a network that was used by the client device to obtain the object.

26. The computing node of claim 22, wherein in response to determining that the object is not authorized to be used to access the network-based content providing a response to invalidate the object to the client device.

27. The computing node of claim 22, wherein in response to determining that the object is authorized to be used to access the network-based content providing a response authorizing the client device to use the object to access the network-based content.

28. The computing node of claim 22, wherein the information associated with the object comprises annotations added by a user of the client device.

* * * * *